F. E. FREEL & E. C. SMITH.
MECHANICAL CLEANING DEVICE.
APPLICATION FILED JUNE 1, 1917.

1,263,545.

Patented Apr. 23, 1918.

F. E. Freel and
E. C. Smith
Inventors

UNITED STATES PATENT OFFICE.

FRANCIS E. FREEL AND EMMOR C. SMITH, OF NILES, OHIO.

MECHANICAL CLEANING DEVICE.

1,263,545.

Specification of Letters Patent.

Patented Apr. 23, 1918.

Application filed June 1, 1917. Serial No. 172,297.

*To all whom it may concern:*

Be it known that we, FRANCIS E. FREEL and EMMOR C. SMITH, citizens of the United States, residing at Niles, in the county of Trumbull, State of Ohio, have invented a new and useful Mechanical Cleaning Device, of which the following is a specification.

The present invention relates to a device for cleaning out ore or incrustation that accumulates on the sides and bottom of shelves in zinc roasters or furnaces, and it is the object of the invention to provide a novel and improved device of that character.

It is the object of the invention to provide cleaning devices attachable to the forward ends of the side bars of a cleaning rake now used, whereby to move in advance of said bars for loosening and cutting the ore incrustation in an effective manner. This work is now generally done by hand, the sides of the shelves being open and the ore being chiseled loose which results in a loss of heat and decrease in production.

A further object of the invention is the provision of a device of the nature indicated embodying cutter wheels, and novel means for mounting and attaching them to the rake, the device being simple and inexpensive in construction and thoroughly serviceable and efficient in use.

With the foregoing and other objects in view, which will appear as the description proceeds, the invention resides in the combination and arrangement of parts and in the details of construction hereinafter described and claimed, it being understood that changes in the precise embodiment of the invention herein disclosed can be made within the scope of what is claimed, without departing from the spirit of the invention.

The invention is illustrated in the accompanying drawing, wherein:—

Figure 1:
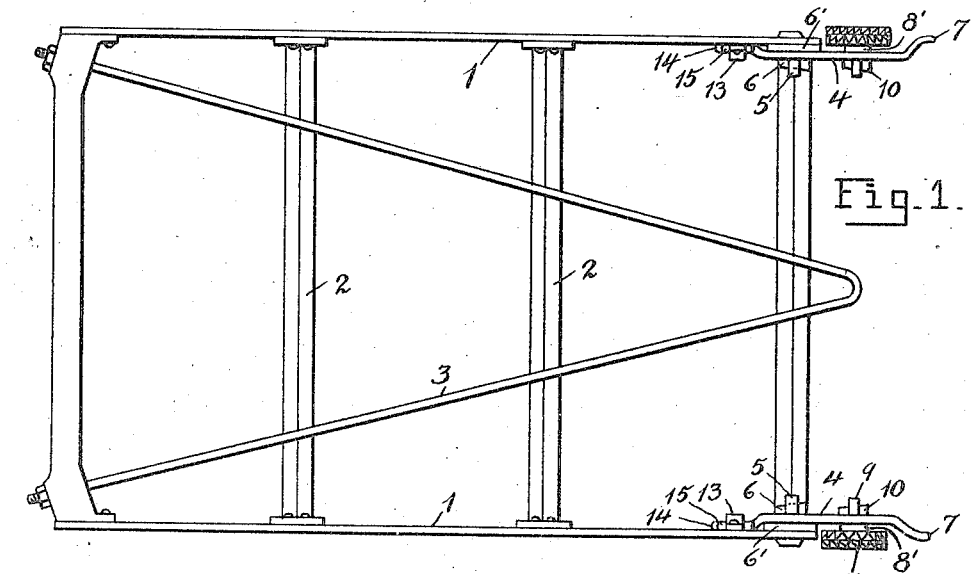
Figure 1 is a plan view of a zinc roaster rake showing the device attached thereto.
Figure 2:
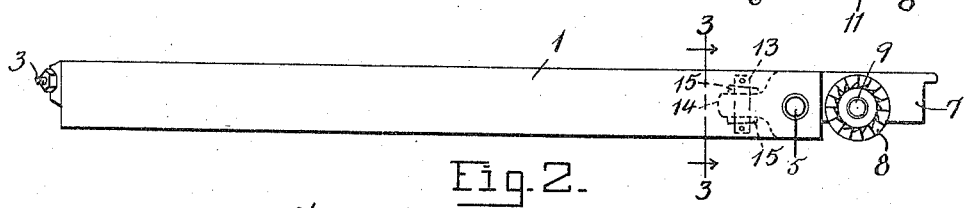
Fig. 2 is an enlarged fragmental elevation of the forward end of the rake.
Figure 5:
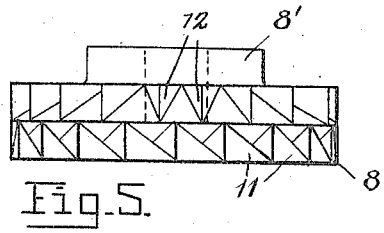
Fig. 5 is a plan view of the wheel.
Figure 3:
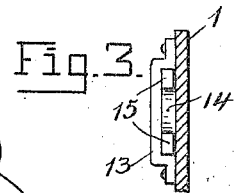
Fig. 3 is a section on the line 3—3 of Fig. 2.
Figure 6:
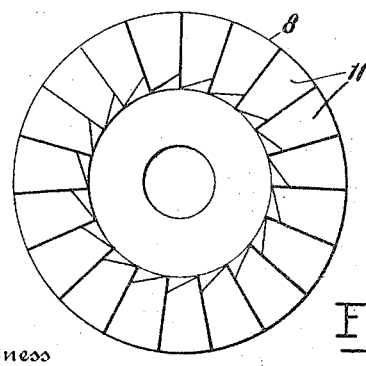
Fig. 6 is a side view of said wheel.
Figure 4:
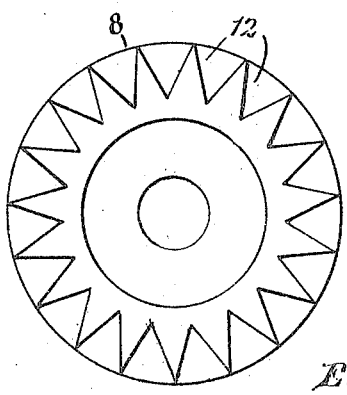
Fig. 4 is an inside face view of one of the cutting wheels.

The conventional form of the zinc roaster rake illustrated embodies the longitudinal side bars 1 set on edge, and connected by transverse cutter bars 2 for cutting the ore from the shelf, the rake being drawn over the shelf by means of a V-shaped bail or pull rod 3 having its terminals connected to the rear end of the rake.

The present invention resides in the provision of means for loosening or cutting the ore or incrustation in advance of the side bars 1, and for this purpose, longitudinal carriers or plates 4 are disposed at the inner sides of the bars 1 at the forward ends thereof, and are pivotally mounted between their ends upon pivots or studs 5 projecting inwardly from the bars 1, wedge-shaped keys 6 engaging said pivots to hold the carriers 4 thereon, and the carriers being spaced inwardly by washers 6′ between the carriers and bars 1. The carriers project forwardly, and their forward ends are curved outwardly, as at 7, to provide pilots for leading the rake through the roaster or kiln, and for deflecting the loose ore inwardly between the bars 1.

Cutter wheels 8 are disposed at the outer sides of the carriers 4 in rear of the outturned pilots and deflectors 7, and in front of the bars 1, said wheels being rotatable upon outstanding spindles or studs 9 carried by the carriers and secured thereto by means of wedge-shaped keys 10 driven through the inner ends of said spindles. The wheels 8 have hubs 8′ bearing against the carriers 4, to space said wheels outwardly therefrom and slightly beyond the outer sides of the bars 1. The outer face of each wheel is unencumbered and provided with radial notches 11 extending to the periphery of the wheel, and providing square cutting shoulders, both on the outer face and periphery of the wheel, so that the outer face can press up against and cut the incrustation on the side wall of the shelf. The inner face of the wheel is provided with radial V-shaped notches 12 extending to the periphery of the wheel and providing V-shaped cutting edges at the inner face and periphery of the wheel. The wheel, therefore, has the cutting portions on its periphery for cutting the ore or incrustation over which the wheel rolls, and has cutting portions on its outer face for cutting the ore or incrustation on the side of the shelf as it rolls in front of the respective bar 1.

In order to adjust the carriers 4 to properly position the wheels, the rear ends of said carriers have extensions 14 projecting within straps 13 having their terminals secured to the inner sides of the bars 1. Said straps are disposed in vertical positions and have their intermediate portions offset inwardly to receive the extensions 14, and wedges 15 are driven between said extensions and the upper and lower ends of the straps, whereby to firmly hold the carriers in place. By loosening the upper wedges, and driving the lower wedges in farther, this will raise the extensions 14 and lower the wheels 8, whereas when the lower wedges are loosened, and the upper wedges are driven in farther, this will raise the wheels 8. In this manner the wheels 8 can be adjusted so that the lower edges of the bars 1 are tangent with the wheels.

The two attachments at the opposite sides are right and left hand, and work automatically when the rake is moved within the roaster, the pilots and deflectors 7 guiding the forward end of the rake and deflecting the loose material inwardly out of the way of the cutter wheels 8, which loosens the ore at the sides of the shelves and on the bottom thereof in front of the bars 1.

The outer faces of the wheels 8 are, ordinarily, the working faces, but since the wheels are provided, on both their inner and outer faces, with cutting means, the wheels may be reversed when desired.

Having thus described the invention, what is claimed as new is:—

A cleaner for the purpose set forth, comprising a support having a projecting side bar with a rotatable cutter wheel mounted thereon, said wheel having cutting means on both its periphery and one of its sides, and said side being substantially flat, or in vertical plane.

In testimony that we claim the foregoing as our own, we have hereto affixed our signatures in the presence of two witnesses.

FRANCIS E. FREEL.
EMMOR C. SMITH.

Witnesses:
DANIEL P. O'CONNELL,
EDWARD L. MCNAMARA.

Copies of this patent may be obtained for five cents each, by addressing the "Commissioner of Patents, Washington, D. C."